United States Patent [19]  [11] 3,920,051
Bell et al.  [45] Nov. 18, 1975

[54] CORROSION RESISTANT CONTINUOUS WELD PIPE

[75] Inventors: John Ray Bell, Grosse Ile Township, Wayne County, Mich.; Richard James Cover, Upper St. Clair Township, Allegheny County, Pa.

[73] Assignee: Jones & Laughlin Steel Corporation, Pittsburgh, Pa.

[22] Filed: Aug. 20, 1974

[21] Appl. No.: 498,897

[52] U.S. Cl. ............... 138/155; 29/196.1; 75/125; 75/128 P
[51] Int. Cl.² ...................... F16L 9/02; C22C 38/42
[58] Field of Search .............. 75/125, 128 R, 128 P; 29/196.1, 191; 138/155

[56] References Cited
UNITED STATES PATENTS

| | | | |
|---|---|---|---|
| 2,378,437 | 6/1945 | Saklatwalla | 75/125 |
| 3,661,537 | 5/1972 | Aronson et al. | 29/191 |
| 3,711,340 | 1/1973 | Korchynsky et al. | 148/36 |

*Primary Examiner*—L. Dewayne Rutledge
*Assistant Examiner*—Arthur J. Steiner
*Attorney, Agent, or Firm*—Gerald K. White; T. A. Zalenski

[57] ABSTRACT

A corrosion resistant continuously welded pipe having high weld ductility is obtained through use of a steel having a composition of 0.08% maximum carbon, 0.30 to 0.50% manganese, 0.05 to 0.09% phosphorous, 0.90 to 1.20% chromium, 0.05% maximum silicon, 0.25 to 0.50% copper, 0.30 to 0.50% nickel, balance essentially iron.

4 Claims, No Drawings

CORROSION RESISTANT CONTINUOUS WELD PIPE

Corrosion resistant alloy steel pipe possesses several advantages over pipe manufactured from plain carbon steel. First of all, corrosion resistant grades of steel can be exposed to atmospheric environments without the need for painting and will ultimately develop a tight, non-flaking brown oxide coating. Secondly, in the event that the pipe is painted, paint life is increased because of the corrosion resistant nature of the pipe. Corrosion resistant steel pipes also may be generally employed for underground environments or for fluid transport with obvious advantages over carbon steel pipes. However, underground performance is often a function of soil type and, hence, performance in a given underground environment is subject to variability.

Pipe of the nature above described is manufactured by the well known continuous butt weld process. Starting material for the process, called skelp, is fed into a furnace and heated to between 2400° and 2500°F. Upon exit from the furnace, edge blowers remove scale and heat the skelp edge to its melting point. The skelp is then bent into the shape of a pipe, welded together by a forge-welding roll, and reduced to final size by reducing rolls. Weldability and weld ductility of the resultant product are critical factors in this process. Most commercially available corrosion resistant alloy steels, i.e., those having corrosion resistance 4 to 6 times that of carbon steels, cannot be readily welded into continuous weld pipe because the elements added to achieve the necessary corrosion resistance adversely affect weldability and weld ductility in continuous welding processes such as the continuous butt weld process.

The invention solves the problem of achieving a continuously welded pipe having good corrosion resistance through use of a steel having a balanced alloy composition that is designed to enable one to easily weld corrosion resistant steel into a pipe. The steel contains 0.08% maximum carbon, 0.30 to 0.50% manganese, 0.05 to 0.09% phosphorous, 0.90 to 1.20% chromium, 0.05% maximum silicon, 0.25 to 0.50% copper, 0.30 to 0.50% nickel, and balance iron.

Therefore, it is an objective of the invention to provide a corrosion resistant alloy steel which has corrosion resistance substantially superior to that of continuously welded carbon steel pipe and is easily formed into pipe by continuous welding.

It is a further objective of the invention to provide a continuously welded corrosion resistant alloy steel pipe having high weld ductility and bendability.

These and other objectives and advantages will occur to those skilled in the art from the following description of the invention.

By limiting the composition of the steel of the invention to within specific ranges of alloying elements, a continuously welded pipe having superior corrosion resistance to that of carbon steel pipe and also having high weld ductility as determined by crush and bend tests may be produced. Compositional limits compatible with the objectives of the invention have been developed for the following reasons.

Carbon should be limited to a maximum of 0.08% in order to promote high weld ductility. Such limit also serves to minimize hardenability. Hardenability is desirably maintained at the lowest possible level, considering the presence of hardenability promoting elements which contribute to the needed corrosion resistance, because high hardenability may promote the formation of relatively embrittling phases such as bainite or even martensite upon cooling from tube production temperatures. Moreover, continously butt welded pipe has a high inherent hardenability because, during its manufacture, the skelp is heated to 2400°–2500°F, with its edges heated even higher. This procedure results in a very large austenitic grain size.

Manganese content should be maintained at about 0.50% maximum in order to promote ductility of the weld. As in the case of carbon, restriction of manganese to no more than the indicated upper limit serves to promote low hardenability and thus, increase weld ductility. A lower limit of 0.30% manganese is preferred because lower Mn contents cause hot shortness by causing the formation of an iron sulfide phase that melts at normal hot-working temperatures.

Literature data, i.e., C. P. Larrabee and S. K. Coburn, 1st International Congress on Metallic Corrosion, (London, April 1961), Butterworths, London (1962) p. 276, indicate that addition of such alloying elements as copper, chromium, nickel, phosphorous, and silicon can be added to steel to increase its resistance to atmospheric corrosion. However, excessive amounts of copper, chromium silicon, or nickel produce poor weld ductility.

Silicon should not exceed 0.05% in order to minimize the occurrence of oxides in the weld zone. Silicon is a strong deoxidizing agent and will cause the formation of embrittling silicon oxide particles along the weld centerline and thus promote weld cracking.

Nickel promotes corrosion resistance. However, during the welding process a brittle 36% Ni-64% Fe phase is formed at the weld line if sufficient nickel is present in the alloy. This nickel-rich phase is believed to be a result of the preferential oxidation and scaling loss of iron during heating in preparation for welding. The above situation leads to a lowering of weld ductility. However, if nickel is maintained below approximately .50%, a 13% Ni-87% Fe phase is formed. Such phase does not affect weld ductility to an unacceptable degree. A minimum of about 0.30% nickel should be present in order to provide for, in combination with other corrosion resistance promoting alloying elements, the requisite degree of corrosion resistance.

Copper is also a corrosion resistance promoting alloying addition. However, copper contents in excess of 0.5% cause hot-shortness unless nickel is present at least in an amount equal to twice the copper content. Because nickel must be restricted to a maximum of 0.50% due to weld ductility considerations, it is thereby impossible to include sufficient nickel to compensate for copper values in excess of 0.50%. Thus 0.50% represents the maximum permissible copper level. A copper content of about 0.40% is preferred so as to further reduce potential hot-shortness problems. A minimum copper level of 0.25% is needed in order to attain the requisite corrosion properties in combination with other corrosion resistance enhancing elements.

Although chromium functions as a deoxidizer, this element is a mild deoxidizer in comparison with silicon. Therefore, relatively higher amounts of chromium may be tolerated before weld ductility problems are encountered due to the formation of oxide particles along the weld centerline. A maximum of 1.20% chromium will ensure that an undue amount of deleterious chromium oxide inclusions will not be present in the weld zone of the pipe. A maximum limit of 1.10% chromium is preferred in order to further enhance weld ductility. In order to ensure that the specified degree of corrosion resistance is obtained, a minimum of 0.90% chromium should be present in the steel of the invention.

Phosphorous is also useful in obtaining the desired corrosion resistance in the tube of the invention. However, phosphorous contents in excess of about 0.09% lead to pipe laminations and excessive hardness levels. It is preferred to limit the phosphorous content to 0.08% in order to further ensure that pipe laminations and excessive hardness is minimized. However, a minimum of about 0.05% phosphorous should be included so as to take advantage of the potent influence of this element upon corrosion resistance.

The beneficial influence upon weld ductility due to the restriction of nickel and silicon is illustrated in Table I. Crush test data contained in this table were determined for 1½inches to 2 inches O.D. pipe which was continuously butt welded from skelp for three corrosion resistant steel compositions. Crush testing is more fully explained later in the description. Steel A is representative of steel pipe of the invention while steels B and C contained excessive amounts of nickel and silicon, respectively. As may be observed, the steel pipe of the invention, with its moderate nickel and low silicon contents, exhibited the highest weld ductility of three compositions. Weld ductility of steel B was impaired due to the presence of the brittle 36% Ni-64% Fe phase at the weld centerline. Steel C also exhibited low weld ductility because of the presence of numerous silicon oxide inclusions at the weld centerline. On the other hand, Steel A contained the 13% Ni-87% Fe phase and only a few, well dispersed chromium oxide inclusions at the weld centerline.

Continuously butt welded steel pipe of the composition of Steel A, shown in Table I, and continuously butt welded plain carbon steel pipe having a composition of 0.11% carbon, 0.44% manganese, 0.006% phosphorous, 0.030% sulfur, 0.009% silicon, and 0.02% copper were subjected to atmospheric corrosion testing in order to demonstrate the superiority of the steel composition of the invention to plain carbon steel. The results of a limited amount of corrosion testing under four atmospheric environments are listed in Table II for the inventive steel and the plain carbon steel. As may be seen, the steel pipe of the invention exhibited superior corrosion resistance in all four tests. It is expected that after a 10 to 15 year period the corrosion resistant composition will exhibit on the order of from 4 to 6 times the corrosion resistance of the plain carbon steel. Marine environments I and II were located at Kure Beach, North Carolina and were selected for their proximity to salt water. Marine environment I was located 800 feet from the sea while Marine environment II was located 80 feet from the sea. The industrial environment selected was Pittsburgh, Pennsylvania while Baldwin, Pennsylvania was selected as the site for the semi-industrial tests.

TABLE II

| | | ATMOSPHERIC CORROSION RESULTS Average Weight Loss (g/ft$^2$) | | | |
|---|---|---|---|---|---|
| Steel | Time (Months) | Marine I | Marine II | Industrial | Semi-Industrial |
| A | 6 | 21.2 | 36.2 | 66.9 | 21.3 |
| | 12 | 36.0 | 61.4 | 82.2 | 41.1 |
| Plain | 6 | 25.5 | 50.3 | 117.8 | 27.5 |
| Carbon | 12 | 38.7 | 90.8 | 215.3 | 44.6 |

From the foregoing discussion it may be seen that the steel composition of the invention has been carefully balanced from the standpoint of attaining the highest degree of corrosion resistance that is consistent with obtaining continuously butt welded steel pipe having high weld ductility and bendability. Such alloy composition enables one to produce a welded pipe product which possesses considerable advantages over carbon steel pipe products.

In order to demonstrate an example of the invention, steel having a composition of 0.06% C, 0.45% Mn, 0.030% S, 0.020% Si, 0.060% P, 0.35% Cu, 1.10% Cr, 0.35% Ni and 0.050 Al was manufactured and processed into skelp through use of conventional procedures. The skelp was then continuously butt welded into 1½inches and 2 inches O.D. pipe. Both pipe sizes were made from the same width skelp; however the 1½inches O.D. pipe was given a larger amount of reduction by the reducing rolls. Product yields were high as the pipe was readily weldable using welding conditions which were the same as normally used for plain carbon steel pipe.

Following pipe production, both sized pipes were subjected to 90° crush testing in accordance with the ASTM Specification A53. Crush testing commprises placing a sample of pipe between two parallel flat surfaces or platens and then applying sufficient pressure to one of the surfaces to cause the pipe to be crushed. The test sample is oriented between the surfaces so that the weld seam is parallel to the surfaces and is 90° away from the axis of loading.

In order to possess adequate weld ductility, the pipe is required by ASTM A53 to crush without weld failure to 75% or less of the original O.D. in a 90° crush test. In other words, the ratio of final O.D. to original O.D. times 100 must be equal to or less than 75%. All pipe tested from both pipe sizes met the 75% requirement. The 1½inches O.D. pipe exhibited generally better crush test performance than the 2 inches O.D. pipe. This is believed to be related to the fact that the 1½inches O.D. pipe was reduced to a greater extent than the larger pipe. The greater degree of reduction is believed to reduce notch severity caused by the continuous butt welding process on the pipe O.D. and, hence, lead to ductility improvement.

TABLE I

| | EFFECT OF STEEL COMPOSITION UPON WELD DUCTILITY | | | | | | | |
|---|---|---|---|---|---|---|---|---|
| | Composition | | | | | | | Final O.D. / original O.D. × 100 |
| Steel | C | Mn | P | Si | Ni | Cu | Cr | |
| A | .06 | .45 | .061 | .016 | .33 | .35 | 1.08 | 60–40 |
| B | .09 | .57 | .002 | .005 | 1.70 | .80 | .04 | 67 |
| C | .08 | .85 | .01 | .67 | — | .33 | .83 | 83 |

Pipes from both lots were also successfully bent 90° over a radius equal to 10 times the diameter of the pipes. These results illustrate that welded pipes of the composition of the invention are readily bendable.

The microstructure of the weld centerline contained the 13% Ni-87% Fe phase. In addition, a small number of chromium oxides were present.

The product had a yield strength of about 40,600 p.s.i. and is capable of reproducibly achieving a 36,000 p.s.i. minimum strength level. Inasmuch as continuously welded carbon steel pipe typically has a yield strength on the order of 25 to 30,000 p.s.i., another advantage of the product of the invention resides in its higher strength level.

We claim:

1. A continuously butt welded alloy steel pipe comprising:
   a steel consisting essentially of 0.08% maximum carbon, 0.50% maximum manganese, 0.05 to 0.09% phosphorous, 0.90 to 1.20% chromium, 0.05% maximum silicon, 0.25 to 0.50% copper, 0.30 to 0.50% nickel and balance iron and having corrosion resistance substantially superior to continuously welded carbon steel pipe and having high weld ductility.

2. A continuously butt welded alloy steel pipe according to claim 1, wherein:
   said phosphorous content is from 0.05 to 0.08%, said chromium content is from 0.90 to 1.10%, and said copper content is 0.25 to 0.40%.

3. A continuously butt welded alloy steel pipe according to claim 1, wherein:
   said manganese content is from 0.30 to 0.50%.

4. A continuously welded alloy steel pipe according to claim 2, wherein:
   said manganese content is from 0.30 to 0.50%.

* * * * *

UNITED STATES PATENT OFFICE
CERTIFICATE OF CORRECTION

Patent No. 3,920,051          Dated November 18, 1975

Inventor(s) John Ray Bell and Richard James Cover

It is certified that error appears in the above-identified patent and that said Letters Patent are hereby corrected as shown below:

Claim 4, line 1: -- butt -- should be inserted immediately following "continuously."

*Signed and Sealed this*

*second* Day of *March 1976*

[SEAL]

*Attest:*

RUTH C. MASON
*Attesting Officer*

C. MARSHALL DANN
*Commissioner of Patents and Trademarks*